US010075348B2

(12) United States Patent
Lund et al.

(10) Patent No.: US 10,075,348 B2
(45) Date of Patent: Sep. 11, 2018

(54) NETWORK SERVICE DISCOVERY

(71) Applicant: Cable Television Laboratories, Inc., Louisville, CO (US)

(72) Inventors: Robert M. Lund, Boulder, CO (US); Steven E. Johnson, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 769 days.

(21) Appl. No.: 14/340,685

(22) Filed: Jul. 25, 2014

(65) Prior Publication Data

US 2016/0028596 A1 Jan. 28, 2016

(51) Int. Cl.
*H04L 29/08* (2006.01)
*H04L 29/06* (2006.01)
*H04L 12/24* (2006.01)
*H04L 29/12* (2006.01)

(52) U.S. Cl.
CPC .......... *H04L 41/5058* (2013.01); *H04L 67/16* (2013.01); *H04L 69/164* (2013.01); *H04L 61/1511* (2013.01); *H04L 61/1541* (2013.01); *H04L 67/02* (2013.01)

(58) Field of Classification Search
CPC ...................................................... H04L 67/16
See application file for complete search history.

(56) References Cited

U.S. PATENT DOCUMENTS

| | | | | |
|---|---|---|---|---|
| 8,254,305 B1* | 8/2012 | Breau | .................. | H04L 61/1541 370/315 |
| 2002/0029256 A1* | 3/2002 | Zintel | .................. | H04L 12/2803 709/218 |
| 2003/0217136 A1* | 11/2003 | Cho | .................... | H04L 12/2818 709/223 |
| 2004/0230636 A1* | 11/2004 | Masuoka | .............. | G06F 9/4443 708/800 |
| 2011/0179184 A1* | 7/2011 | Breau | .................. | H04L 61/106 709/231 |
| 2013/0205018 A1* | 8/2013 | Rahman | .................. | H04L 67/16 709/224 |

* cited by examiner

Primary Examiner — Tom Y Chang
(74) Attorney, Agent, or Firm — Great Lakes Intellectual Property, PLLC

(57) ABSTRACT

Service discovery for an application lacking capabilities sufficient to facilitate Universal Plug and Play (UPnP), Zero-configuration networking (Zeroconf), Simple Service Discovery Protocol (SSDP) or other service discovery protocols relying upon multicast User Datagram Protocol (UDP) is contemplated. The service discovery may be facilitated with a discovery proxy configured to identify available services and a discovery service having capabilities sufficient to apprise the application of the services identified with the discovery proxy.

20 Claims, 2 Drawing Sheets

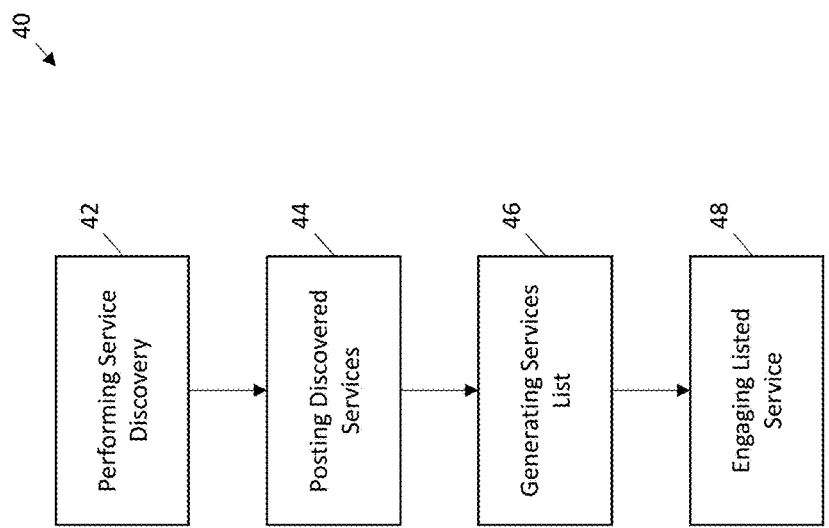

NETWORK SERVICE DISCOVERY

TECHNICAL FIELD

The present invention relates to facilitating network service discovery, such as but not necessary limited to enabling service discovery for applications lacking capabilities sufficient to discover services using Universal Plug and Play (UPnP), Zero-configuration networking (Zeroconf), Simple Service Discovery Protocol (SSDP) or other service discovery protocols relying upon multicast User Datagram Protocol (UDP), other multicast dependent messaging.

BACKGROUND

Service discovery, which may be interchangeably referred to as network service discovery, generally relates to a process of services announcing themselves and/or their capabilities to other devices in communication therewith, e.g., devices connected to a common or related network link may facilitate service discovery in order to advertise their services to others, such as in the manner described in U.S. patent application Ser. No. 14/334,027, entitled Service Discovery Within Multi-Link Networks, the disclosure of which is hereby incorporated by reference in its entirety herein. Multiple protocols, such as but not necessary limited to Universal Plug and Play (UPnP), Zero-configuration networking (Zeroconf) and Simple Service Discovery Protocol (SSDP), rely upon multicast User Datagram Protocol (UDP) to facilitate service discovery. Multicast UDP, or other similarly multicast dependent protocols, requires applications intending to utilize discovered services to include capabilities sufficient for the attendant multicasted communications. As some applications, such as Web browsers, may be unable to support multicast UDP related service discovery, one non-limiting aspect of the present invention contemplates enabling such applications, devices, etc. to utilize service discovery without having to support the multicast UDP dependent service discovery associated with UPnP, Zeroconf, SSDP, etc.

BRIEF DESCRIPTION OF THE DRAWINGS

FIG. 2 illustrates a flowchart for a method of facilitating service discovery in accordance with one non-limiting aspect of the present invention.

DETAILED DESCRIPTION

Figure 1:
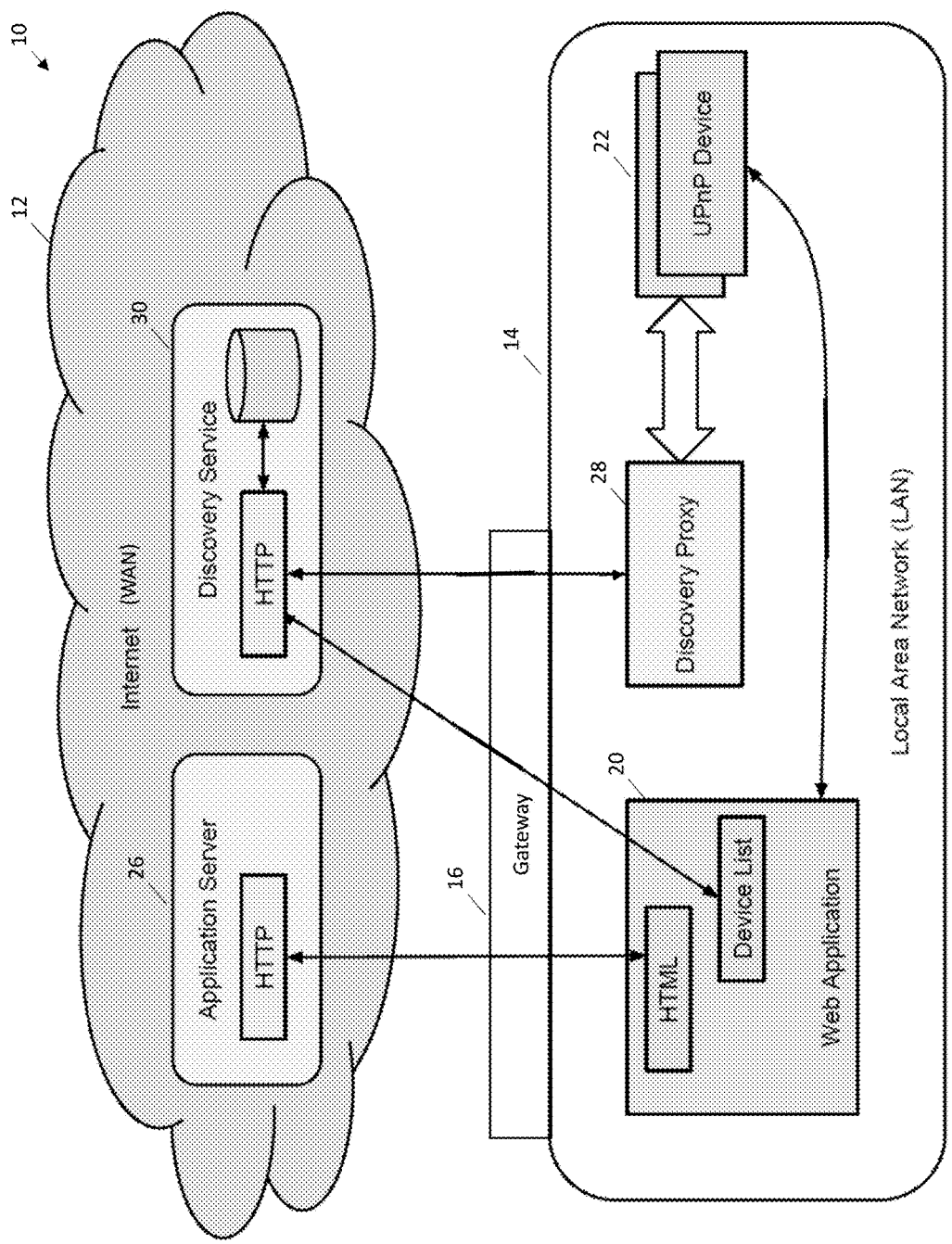
FIG. 1 illustrates a system for facilitating service discovery in accordance with one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a system 10 for facilitating service discovery in accordance with one non-limiting aspect of the present invention. The system 10 is predominately described with respect to facilitating service discovery according to Universal Plug and Play (UPnP), such as that described within UPnP Device Architecture 1.0, published October 2008 by the UPnP Forum, and Simple Service Discovery Protocol (SSDP), such as that described in Simple Service Discovery Protocol/1.0, published October 1999 by The Internet Engineering Task Force (IETF), the disclosures of which are hereby Incorporated by reference in their entireties. The present invention is not necessarily limited to UPnP or SSDP and fully contemplates its use and application in facilitating service discovery according to Zero-configuration networking (Zeroconf) or other protocols that similarly rely upon multicast User Datagram Protocol (UDP), or other similarly multicast dependent protocols, to facilitate service discovery. The present invention contemplates the system 10 being configured to facilitate service discovery using such multicast UDP dependent service discovery protocols in order to demonstrate its applicability in facilitating service discovery for entities, applications, devices, etc. lacking capabilities sufficient to support multicast service discovery.

The system 10 illustrates an exemplary environment where a wide area network (WAN) 12 interacts with a local area network (LAN) 14 via a gateway 16. The WAN 12 may be associated with a cable television service provider, a multiple system operator (MSO), an Internet service provider (ISP), a cellular phone service provider or other service provider having capabilities sufficient to provide or enable communications with the LAN 14. The LAN 14 may be an inside network or other private network outside or independent of the WAN 12 associated with a subscriber or customer of the service provider, such as but not necessary limited to a network small office and home office (SoHo). The gateway 16 may be a customer edge router (CER) configured to comply with RFC 6204, RFC 6204BIS, and IPv4 and IPv6 eRouter Specification (CM-SP-eRouter-I08-120329), the disclosures of which are hereby incorporated by reference in their entirety. The gateway 16, and optionally additional internal routers (IR) or other devices downstream thereof within the LAN 14, may also be configured to facilitate various operations, such as adaptive prefix delegation, role based router functionality, interface directionality assignment, overlay networking and/or multi-link service discovery, such as in the manner described in U.S. patent application Ser. Nos. 61/712,318, 61/771,807, 13/783,242, 13/792,023, 13/792,016, 13/836,948, 13/652,700 and 14/334,027, the disclosures of which are hereby incorporated by reference in their entireties.

The contemplated service discovery generally relates to enabling devices to announce, discover or otherwise control their services and/or the services offered or available from other devices. As a single device may offer multiple services and/or be capable performing multiple service related operations, which may take the form of applications, executables, operating systems or other logically functioning constructs, the use of the term "services" is a broad and generic nomenclature intended to encompass any capability of such logically functioning constructs to facilitate delivering content/data, performing operations or otherwise assisting another device, application or service. The LAN 14 is shown to include various standalone boxes in order to facilitate presentation and without necessarily limiting the scope and contemplation of the present invention to independent devices or entities associated therewith. The boxes may be included on the same device and/or otherwise related and need not be dispersed in the illustrated manner. One non-limiting aspect of the present invention contemplates a need to enable a Web application or other limited application, device or service 20 to discover services within the LAN 14, such as those offered by UPnP devices and/or other devices, applications or services 22 according to multicast UDP or other multicast dependent messaging.

The Web application 20 may be a Web browser or other application operating on a computer, a mobile phone, a tablet or other device capable of supporting browsing of webpages, such as the Web browser described in U.S. patent application Ser. No. 13/922,386, entitled Administration of Web Page, the disclosure of which is hereby Incorporated by reference in its entirety. The Web application 20 may facilitate browsing webpages, such as but necessarily limited to those formatted according to HyperText Markup Language (HTML) and transmitted according to Hypertext Transfer Protocol (HTTP) using Transmission Control Protocol (TCP). The Web application 20 may be considered as a connection-based application in so far as it may require communications with a server 26 downloading a webpage or other entity in communication therewith to occur in a point-to-point manner, i.e., without the corresponding signaling, communications or messaging being transmitted to other endpoints or otherwise multicasted. The connection-based communications of TCP and other similar protocols may be contrasted with the connection-less or multi-point communications associated with UDP and other similar protocols where signaling, communications or messaging may be transmitted to multiple endpoints simultaneously, such as to facilitate SSDP where queries, announcements or other service discovery related messaging may be multicasted to each device or service in communication therewith.

The Web application 20 is presented as one example of a service lacking capabilities sufficient to support service discovery using multicast communications or any other discovery mechanism that exposes private LAN information to any Web application 20 for exemplary non-limiting purposes as the present invention fully contemplates its use with other applications, devices or services similarly lacking capabilities required to listen to multiple endpoints or otherwise simultaneously support multiple sockets associated with multicast-based communications. The Web application 20 may be configured to support multicast communications, such as with a specifically designed application program interface (API), at the risk of compromised security, e.g., enabling the Web application 20 to support multicast service discovery may enable services outside of the LAN 14 to snoop services within the LAN 14 and information intended to be kept private (browsing history, caches, etc.) or otherwise burden the Web application 20 with facilitating discovery requests and other communications when attempting to connect outside of the LAN 14 to services in communication with the WAN 12. The risks of user compromised security have resulted in general browser vendor rejection of proposals to add service discovery to their browsers. One non-limiting aspect of the present invention contemplates enabling off-the-shelf or common Web applications 20 and browsers to facilitate service discovery in a manner consistent with their normal operations and without compromising security, exposing private LAN information or requiring specialized APIs by instead utilizing HTTP, TCP and other resident capabilities.

The system 10 may include a discovery proxy 28 configured to facilitate multicast UDP service discovery. The discovery proxy 28 may be configured to issue service discovery requests and to receive service discovery responses and announcements from UPnP or other devices 22 connected to the LAN 14 offering services. The discovery proxy 28 may be configured to operate according to the service discovery messaging and requirements associated with SSDP. The discovered services may be configured to provide service descriptions to the discovery proxy to identify their capabilities and attendant operating considerations. The discovery proxy 28 may discover SSDP services using the reserved IPv4 local administrative scope multicast address 239.255.255.250 or an IPv6 multicast address as defined in http://www.iana.org/assignments/ipv6-multicast-addresses/ipv6-multicast-addresses.xhtml, the disclosure of which is hereby incorporated by reference in entirety herein, over an SSDP port or other sufficient multicast channel/port. Discovery may occur when the discovery proxy 28 or other connected device multicasts a HTTP UDP discovery request to the SSDP multicast channel/port. Services 22 listening to the SSDP multicast channel/port may hear the discovery requests and reply with a HTTP UDP discovery response indicating a service it offers matching the request (in some cases, such as when issuing announcements, the services 22 may transmit discovery descriptions relating to their offered services).

Such discovery responses, announces, etc. may include a service description for the correspondingly offered service. The service descriptions may include a unique pairing of a service type uniform resource identifier (URI) and a Unique Service Name (USN) URI. The service types may identify a type of service, such as a television, settop box (STB), etc. or other description of the service being offered. The USN may be a URI that uniquely identifies a particular instance of a service, such as to differentiate between two services with the same service type. In addition to providing a service type and/or a USN URI, discovery results and presence announcements may also provide expiration and location information. Location information may be used to identify another entity should contact or otherwise engage a particular service, optionally one or more location URIs or universal resource locators (URLs) may be included in a discovery response or a presence announcement to facilitate communications. Expiration information may be used to identify how long the discovery proxy 28 and other applications/services 22 receiving discovery information should keep the information in its cache, i.e., how long the corresponding services can be assumed to be available. Of course, additional information may be included within the service descriptions depending on the service discovery protocol being utilized, e.g., multicast Domain Name System (mDNS) may include resource records in place of or in addition to the service descriptions.

The discovery proxy 28 may be configured to process the service descriptions and transmit related information to a discovery service 30. The discovery service 30 may include a database to keep track of various services in use across multiple LANs according to an outside Internet Protocol (IP) address assigned by the gateway 16 or other medium utilized to facilitate communications between the LAN 14 and the WAN 12. One non-limiting aspect of the present invention contemplates the discovery proxy 28 being configured to convert some or all of the service description information received according to the multicast and unicast UDP transmission to a form suitable for point-to-point communications with the discovery service 30, such as via HTTP using HTTP requests, gets, etc. The use of HTTP and/or TCP to transmit the service information obtained with the discovery proxy 28 from the service descriptions may be beneficially in enabling the discovery service 30 to communicate securely with the discovery proxy 28 and to subsequently communicate the service information to the Web application 20 and other services unable to process UDP-based communications. The discovery service 30 may be configured to receive a request from the Web application 20 using HTTP get or other standard mechanism commonly available to Web applications and in turn provided corresponding service information sufficient for the Web application 20 to identify the services detected with the local discovery proxy 28.

The service information transmitted from the discovery service 30 via HTTP to the Web application 20 may include the entirety of the service description(s) provided to the discovery proxy and/or relevant portions thereof, such as the service type URI, USN URI, location URI and/or expiration information. Optionally, the discovery proxy 28 may be configured to parse or otherwise recover the information usable to the Web application 20 prior to transmitting the service information to the discovery service 30, i.e., to send the usable or suitable service information instead of the entire service description so as to limit the service information stored in the database to that suitable to use with the Web application 20 or other service requesting the same. The discovery service 30 may be configured to ascertain a source address or other addressing information included in the device list request to determine the service information appropriate to the corresponding LAN 14, e.g., the source address in the device list request may match or be sufficiently related by range to the IP address included with the messaging from the discovery proxy 20 such that all available service information stored in the database for the corresponding IP address may be provided to the Web application 20. The device list may for exemplary purposes correspond with the discovery process described in Block 78 of U.S. patent application Ser. No. 14/284,667, entitled Delegating Authorizations, the disclosure of which is hereby incorporated in its entirety herein, as other requests for other purposed may be similar used without deviating from the scope and contemplation of the present invention.

The system 10 may include the application server 26 configured to download or otherwise provide a webpage to the Web application 20 to facilitate use of the service information previously provided or subsequently obtained from the discovery service 30. The webpage may correspond with the My Stuff Everywhere (MSE) webpage described in the above-reference patent application to facilitate identifying televisions or other devices within the LAN suitable to facilitating access to subscriber content. The webpage downloaded from the application server 26 may include instructions sufficient for the Web application 20 to utilize at least some of the information included in the service information provided from the discovery service 30 to query/control the services available from the UPnP devices 22. The webpage may include Extensible Markup Language (XML) sufficient for controlling the Web application 20 to subsequently communicate with the one or more of the offered services using HTTP, e.g., using the returned device information, the Web application 20 can query/control the UPnP device in the same manner as if the Web application had the native capability to perform the UPnP device discovery function, such as to get the device description URL or URI, retrieve the device description, get control URLs for services (as found in the device description) and/or derive and use other control URLs constructed using a LOCATION header in the device description (DIAL extension).

The ability to provide the services information to the Web application 20 separately from the webpage making use thereof may be beneficial in ameliorating the amount of data being downloaded from the discovery service 30 to the Web application 20, to enable discovered services to be identified to the Web application 20 without requiring the attendant services information to be encapsulated within a full webpage and/or to enable services information to be provided to the Web application in the background without requiring the user to control the Web application 20 to the downloaded webpage. The capability to provide service information without disrupting operation of the Web application 20 may be beneficial to enable services information to be continuously provided to the Web application 20 without disrupting services or operation of the Web application 20 as new services are discovered and existing services expire. The present invention is not necessarily so limited and fully contemplates the services information being provided to the Web application 20 while encapsulated within a downloaded webpage, which may be desirable in the event the service provider attempts to implement parental controls or commands intended to dictate operations of the Web application 20 through forced download and/or display of a corresponding webpage (e.g., security or alarm systems may desire display of a webpage or other interface to generate alerts within the home).

FIG. 2 illustrates a flowchart 40 for a method of facilitating service discovery in accordance with one non-limiting aspect of the present invention. The method may be embodied in a computer-readable medium having a plurality of non-transitory instructions, operable with a processor associated with the UPnP devices 22, the discovery proxy 28, the discovery service 30, the Web application 20 and/or the application server 26 as appropriate, to facilitate the contemplated service discovery. Block 42 relates to performing service discovery within the LAN 14 or other inside network where UPnP devices 22 may advertise available services using the discovery proxy 28 or other device inside the LAN 14 having access to UDP or other multicast messages utilized for service discovery. The service discovery may be performed by the discovery proxy 28 automatically issuing service queries over the LAN 14 on a periodic basis to determine available services, in response to UPnP devices 22 announcing themselves and/or instructions being provided from the discovery service 30 to the discovery proxy 28 to instigate service discovery. Service descriptions may be generated or provided from the discovered services in the manner described above to facilitate identifying the services, information necessary to communicate therewith, time of life and/or other relevant parameters.

Block 44 relates to posting discovered services to the discovery service 30 or other entity outside of the LAN 14. The posting of the discovered services outside of the LAN 14 may be beneficial in enabling subsequent communication of the discovered information to an entity that would otherwise be unable to identify the services due to security constraints or limitations of the service discovery protocol, i.e., the gateway 16 may prevent entities outside of the LAN 14 from receiving or detecting the internal multicast service discovery messaging. The discovered services may be posted by transmitting corresponding HTTP messages to the discovery service 30 with service information sufficient for identifying available services to the Web application 20. The services information being posted may be obtained from the service descriptions provided to the discovery proxy 28 whereby the discovery proxy 28 may post portions of or the entirety of the received service descriptions. The discovery proxy 28 may optionally post a URL or other identifier from which the Web application 20 may obtain the service descriptions within the LAN 14 or another location associated with the WAN 12, e.g., the discovery proxy 28 may store the service information/descriptions locally for retrieval therefrom using an appropriate download link (URL) or HTTP retrieval methodology.

Block 46 relates to generating a services list for the discovered services sufficient for use with the Web application 20 or other service operating within the LAN 14 and unable to determine the services according to the active service discovery protocol. The services list may be kept at the discovery service 30 and organized according to an outside IP address associated with the LAN 14 or other sufficient identifier and/or at the Web application 20 as a function of corresponding information provided from the discovery service 30. The services list may be a table or other construct sufficient for identifying relevant information included within the service descriptions in a form usable with the Web application 20. The table could be kept at the discovery service 30 for download or kept at the Web application 20 and updated with service changes using HTTP gets and responses. The services list may be generated on an as needed basis and/or automatically updated and manipulated as the discovered services change. One non-limiting aspect of the present invention contemplates use of the services list or similar tabulation independently of encapsulating the services information in a webpage so as to enable the use thereof without having to download a webpage to the Web application 20.

Block 46 relates to engaging one or more of the services identified within the services list using the Web application 20. The system 10 described above contemplates engaging the service using a webpage downloaded to manipulate the service information, such as in response to a user controlling the Web application 20 to an MSE webpage utilized to facilitate accessing content on various devices associated with the LAN 14. The exemplary use of a webpage having XML instructions or other suitable instructions for facilitating the Web application 20 controlling/querying the engaged services using the service information delivered thereto from the discovery service 30 is provided for exemplary non-limiting purposes as the service information/descriptions may be similarly utilized without having to download a webpage, e.g., the services information may be provided to another application in the background or otherwise in order to apprise the application of service changes/updates whereby that application may make automatic or necessary adjustments depending on its particular usage. The present invention contemplates any number of applications, devices or services lacking capabilities to facilitate service discovery utilizing the service information assessed descriptions provided from the discovery service for any number of reasons, and as such, is not limited to any particular implementation.

As supported above, one non-limiting aspect of the present invention relates to utilizing networking protocols, such as UPnP and Zeroconf, to allow networked devices to share services over the interconnecting network using a Network Service Discovery Proxy (NSDP) that performs the discovery function and makes network protocol addresses available to the shared services available to applications that cannot directly perform the discovery function. The Network Service Discovery Proxy (NSDP) may include a discovery proxy and a discovery service operable in the following manner: (1) A Discovery Proxy network device (which may be software, hardware or a combination) discovers UPnP Devices are discovered by the Discovery Proxy using the SSDP protocol (M-SEARCH, NOTIFY) on the LAN. Information about discovered devices is returned to the Discovery Proxy; (2) A Discovery Proxy is associated with a Discovery Service. This may be done by user configuration, an embedded property in the Discovery Proxy device, or some other manner. Discovered device information may be sent to the Discovery Service using HTTP POST requests. The Discovery Service stores and associates the discovered devices information associated with an identifier of the Discovery Proxy device. The identifier could be the public IP address of the LAN, a unique name of the Discovery Proxy device or some other mechanism; (3) The Web Application requests a list of discovered devices. The Discovery Service determines the identifier of the appropriate Discovery Device. This identifier may be specified in the Web Application request, inferred by the public IP address of the device executing the Web Application or some other means. The Discovery Services returns the appropriate device information to the Web Application; and (4) Using the returned device information, the Web Application can query/control the UPnP device in the same manner as if the Web Application had thenative capability to perform the UPnP device discovery function.

One non-limiting aspect of the present invention contemplates enabling any existing application, e.g. Web, iOS, Android, to make use of LAN network services, such as UPnP, Bonjour and DIAL, without requiring browser or native app implementation of the discovery mechanism, which may be commercially valuable as there are many applications, such as CVP-2, Web, iOS and Android that would benefit from access to LAN network services but do not have the capability.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating service discovery for a Web application when the Web application is unable to support service discovery using multicast User Datagram Protocol (UDP), the method comprising:

receiving at a discovery service a first post originating from a discovery proxy connected to a local area network (LAN) operating downstream of a gateway, the first post being communicated from the discovery proxy over the LAN and thereafter from the gateway over a wide area network (WAN) connected to the discovery service according to Transmission Control Protocol (TCP), the first post including a first description for a first service connected to the LAN, the discovery proxy determining the first description as result of a first response unicasted from the first service over the LAN according to UDP, the first response and the first description being formatted according to Simple Service Discovery Protocol (SSDP), the first service generating the first response in reply to receiving a first service discovery request multicasted over the LAN from the discovery proxy according to UDP, the first service discovery request being communicated to the Web application over the LAN and unusable thereat to discover the first service due to the Web application being unable to support service discovery using multicast UDP; and transmitting a second post from the discovery service to the gateway over the WAN according to TCP for subsequent communication over the LAN to the Web application, the second post sufficient for the Web application to discover the first service without having to support service discovery using multicast UDP due to the second post including at least some information of the first description included with the first post.

2. The method of claim 1 further comprising:
determining the at least some information of the first description to include a service type uniform resource identifier (URI) and a unique service name identifier (USN) URI; and
generating the second post to include the service type URI and the USN URI included in the first description.

3. The method of claim 1 further comprising:
determining the first post to be formatted according to Hypertext Transfer Protocol (HTTP); and
generating the second post according to HTTP.

4. The method claim 1 further comprising downloading a webpage formatted according to HyperText Markup Language (HTML) to the Web application, the webpage including instructions sufficient for the Web application to utilize the at least some information included in the second post to query/control the first service.

5. The method of claim 4 further comprising the webpage including instructions sufficient for the Web application to query/control the first service according to HTTP.

6. The method of claim 4 further comprising transmitting the second post from the discovery service to the Web application independently of the webpage.

7. The method of claim 4 further comprising encapsulating the second post at the discovery service within the webpage prior to being downloaded to the Web application.

8. The method of claim 1 further comprising instructing the discovery proxy to multicast the first service discovery request over the LAN according to Universal Plug and Play (UPnP).

9. The method of claim 1 further comprising instructing the discovery proxy to multicast the first service discovery request over the LAN to an administrative scope multicast address.

10. The method of claim 1 further comprising transmitting the second post to the Web application in response to receiving a device list post from the Web application, the device list post requesting identification of services discoverable over the LAN according to Simple Service Discovery Protocol (SSDP).

11. A system for facilitating service discovery for a Web application when the Web application is unable to support Simple Service Discovery Protocol (SSDP) service discovery, the system comprising:
a gateway demarcating a wide area network (WAN) from a local area network (LAN) such that communications between the WAN and the LAN pass through the gateway, the gateway including a non-transitory computer-readable medium having a first plurality of instructions executable with an associated processor to block communication over the WAN of SSDP service discovery formatted messaging originating on the LAN so as to prevent entities connected outside of the LAN from performing SSDP service discovery based thereon;
a discovery proxy connected to the LAN and including a non-transitory computer-readable medium having a second plurality of instructions executable with an associated processor to:
  i) determine service descriptions using SSDP service discovery executed over the LAN, the service descriptions identifying services available to the Web application over the LAN; and
  ii) post without being blocked by the gateway at least a portion of the service descriptions to the WAN using Hypertext Transfer Protocol (HTTP); and
a discovery service connected to the WAN and including a non-transitory computer-readable medium having a third plurality of instructions executable with an associated processor to:
  i) process the service descriptions posted from the discovery proxy over the WAN; and
  ii) transmit information derived from the service descriptions to the Web application according to HTTP, the information being sufficient for the Web application to discover the services determined by the discovery proxy to be available over the LAN.

12. The system of claim 11 wherein:
each service description includes a service type uniform resource identifier (URI) and a unique service name identifier (USN) URI for the corresponding service; and
the third plurality of instructions are sufficient to include the service type URI and the USN URI for each service with the information transmitted to the Web application to facilitate discovery of the services available over the LAN.

13. The system of claim 11 wherein the second plurality of instructions are sufficient to:
multicast SSDP service discovery requests over the LAN according to UDP; and
determine at least some of the service descriptions from responses transmitted from the services in reply to one or more of the SSDP service discovery requests, the responses being transmitted over the LAN to the discovery proxy and the Web application according to UDP, the Web application being unable to process the received SSDP service discovery requests to determine the services associated therewith.

14. The system of claim 13 wherein the second plurality of instructions are sufficient to:
determine a service type uniform resource identifier (URI) and a unique service name identifier (USN) URI included in each of the SSDP service descriptions; and
transmit the service type URI and USN URI for each service to the discovery service.

15. The system of claim 14 wherein the third plurality of instructions are sufficient to transmit a webpage formatted according to HyperText Markup Language (HTML) to the Web application, the webpage including instructions sufficient for the Web application to utilize the service type URI and USN URI for each service.

16. The system of claim 15 wherein the third plurality of instructions are sufficient to transmit the service type URI and USN URI for each service to the Web application independently of the webpage.

17. The system of claim 15 wherein the third plurality of instructions are sufficient to encapsulate the service type URI and USN URI for each service within the webpage prior to being downloaded to the Web application.

18. The system of claim 11 wherein the second plurality of instructions are sufficient to:
associate the services available over the LAN with a public Internet Protocol (IP) address of the LAN; and
select the information transmitted to the Web application as a function of a source address included in a device list request issued from the Web application, the selected information being that of the services associated with the public IP address matching the source address.

19. A non-transitory computer-readable medium having a plurality of non-transitory instructions operable with a processor to facilitate a discovery proxy sufficient for enabling an application to discover services advertised over a local area network (LAN) using multicast User Datagram Protocol (UDP) when the application is unable to directly discover the service using UDP, the non-transitory instructions being sufficient for:

discovering the services available over the LAN using multicast UDP;

posting the discovered services to a discovery service outside of the LAN, the discovery service being unable to directly discover the services available over the LAN due to corresponding LAN security measures, the discovery service being capable of communicating information sufficient to apprise the application of the services available over the LAN using Transmission Control Protocol (TCP); and discovering the services as a function of descriptions transmitted from the services within Simple Service Discovery Protocol (SSDP) messages communicated over the LAN, each description including at least a service type uniform resource identifier (URI) and a unique service name identifier (USN) URI for the corresponding service.

20. The non-transitory computer-readable medium of claim 19 further comprising non-transitory instruction sufficient for posting at least the service type URI and the USN URI included in each description to the discovery service, the discovery service using the service type URIs and the USN URIs to apprise the application of services available over the LAN.

* * * * *